(12) United States Patent
Boic et al.

(10) Patent No.: US 12,106,607 B2
(45) Date of Patent: Oct. 1, 2024

(54) FACE LIVENESS DETECTION

(71) Applicant: RealNetworks LLC, Seattle, WA (US)

(72) Inventors: Miko Boic, Seattle, WA (US); Ivan Krešo, Sisak (HR); Pavle Prentašić, Koprivnica (HR); Iva Harbaš, Zagreb (HR)

(73) Assignee: REALNETWORKS LLC, Seattle, WA (US)

( * ) Notice: Subject to any disclaimer, the term of this patent is extended or adjusted under 35 U.S.C. 154(b) by 309 days.

(21) Appl. No.: 17/698,800

(22) Filed: Mar. 18, 2022

(65) Prior Publication Data

US 2022/0309837 A1  Sep. 29, 2022

Related U.S. Application Data

(60) Provisional application No. 63/165,657, filed on Mar. 24, 2021.

(51) Int. Cl.
*G06V 40/40* (2022.01)
*G06V 10/82* (2022.01)
*G06V 40/16* (2022.01)

(52) U.S. Cl.
CPC .............. *G06V 40/45* (2022.01); *G06V 10/82* (2022.01); *G06V 40/166* (2022.01)

(58) Field of Classification Search
CPC ...... G06V 40/45; G06V 10/82; G06V 40/166; G06V 40/172; G06V 40/1394; G06V 40/40; G06V 10/75; G06V 10/764; G06V 40/165; G06V 40/1388; G06V 10/44; G06V 10/7553; G06V 10/88; G06V 40/10; G06V 40/117; G06V 40/16; G06V 40/171; G06V 40/18; G06V 40/197; G06V 10/10; G06V 10/40; G06V 10/774; G06V 10/776; G06V 20/647; G06V 40/1365; G06V 40/15; G06V 40/70; G06F 16/784; G06F 21/32; G06F 16/345; G06F 18/22; G06F 40/30; G06F 18/00; G06F 2221/2139; G06F 18/214;
(Continued)

(56) References Cited

U.S. PATENT DOCUMENTS

10,810,725 B1 * 10/2020 Dolhansky ........... G06V 10/764
2013/0016882 A1 * 1/2013 Cavallini ................ G06F 18/22
382/117
(Continued)

*Primary Examiner* — Nimesh Patel
(74) *Attorney, Agent, or Firm* — Seed IP Law Group LLP (57) ABSTRACT

A system includes a camera and a computing device. The computing device receives images captured by the camera and identifies a face in the image. A quality of the face and context surrounding the face are determined as to whether they are sufficient for determining liveness of the face. If so, a narrow-face-texture probability and a broad-face-context probability that the face is live are determined. The probabilities are compared to a live threshold and a fake threshold. In response to both probabilities exceeding the live threshold, an indication that the face is live is output. In response to either the narrow-face-texture probability or the broad-face-context probability, or both, being below the fake threshold, an indication that the face is fake is output. In response to both probabilities being above the fake threshold and below the live threshold, an indication that the image includes insufficient information is output.

19 Claims, 7 Drawing Sheets

(58) Field of Classification Search
CPC .......... G06F 3/012; G06F 3/013; G06F 3/017;
G06T 17/00; G06T 2207/20081; G06T
2207/20084; G06T 1/0007; G06T
2207/20224; G06T 2207/30041; G06T
5/50; G06T 5/70; G06T 1/00; G06T 7/11;
G06T 7/593; G06N 3/045; G06N 3/08;
G06N 3/04; G06N 20/00; G06N 3/0464;
G06N 3/082; G06N 7/01
See application file for complete search history.

(56) References Cited

U.S. PATENT DOCUMENTS

| | | | |
|---|---|---|---|
| 2018/0046852 A1* | 2/2018 | Ionita | G06V 40/167 |
| 2019/0197331 A1* | 6/2019 | Kwak | G06V 40/50 |
| 2020/0082192 A1* | 3/2020 | Ding | G06V 40/162 |
| 2021/0224369 A1* | 7/2021 | Levitov | G06F 21/32 |
| 2023/0222842 A1* | 7/2023 | Hua | G06V 40/45 |
| | | | 382/181 |

* cited by examiner

FACE LIVENESS DETECTION

TECHNICAL FIELD

The present disclosure is related generally to determining if a subject in an image is a live person, and particularly to utilizing a single camera and multiple probability analyses to determine if the image is of a live person.

BACKGROUND

Description of the Related Art

The popularity of technologies for automatically recognizing persons by using facial images has rapidly increased due to the ease and convenience for users, as well as the advancement of facial recognition techniques. Some facial recognition techniques, however, can be compromised by security vulnerabilities. For example, systems configured to unlock in response to capturing a static image depicting an authorized user's face could be exploited using a photograph of the user's face. Some devices and systems are configured to require dynamic image capturing of a user in motion or otherwise demonstrating the liveness of the user. Such devices and systems may also be vulnerable to identity spoofing, such as by displaying a video of the authorized user. It is with respect to these and other considerations that the embodiments described herein have been made.

BRIEF SUMMARY

Briefly described, embodiments are directed toward systems and methods of utilizing a single camera to capture images of a subject's face and perform multiple probability analyses to determine a liveness of the face depicted in the images. By more accurately determining the liveness of the subject's face, additional processing or user authentication can be performed if the face is determined to be that of a live person. In this way, the risks of a person trying to spoof or fake the face of an authorized user is reduced.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of embodiments of the present disclosure, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including, but not limited to, the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive, and allows for being based on additional features, functions, aspects, or limitations not described, unless the context clearly dictates otherwise. In addition, throughout the specification, the meaning of "a," "an," and "the" include singular and plural references.

Figure 1:
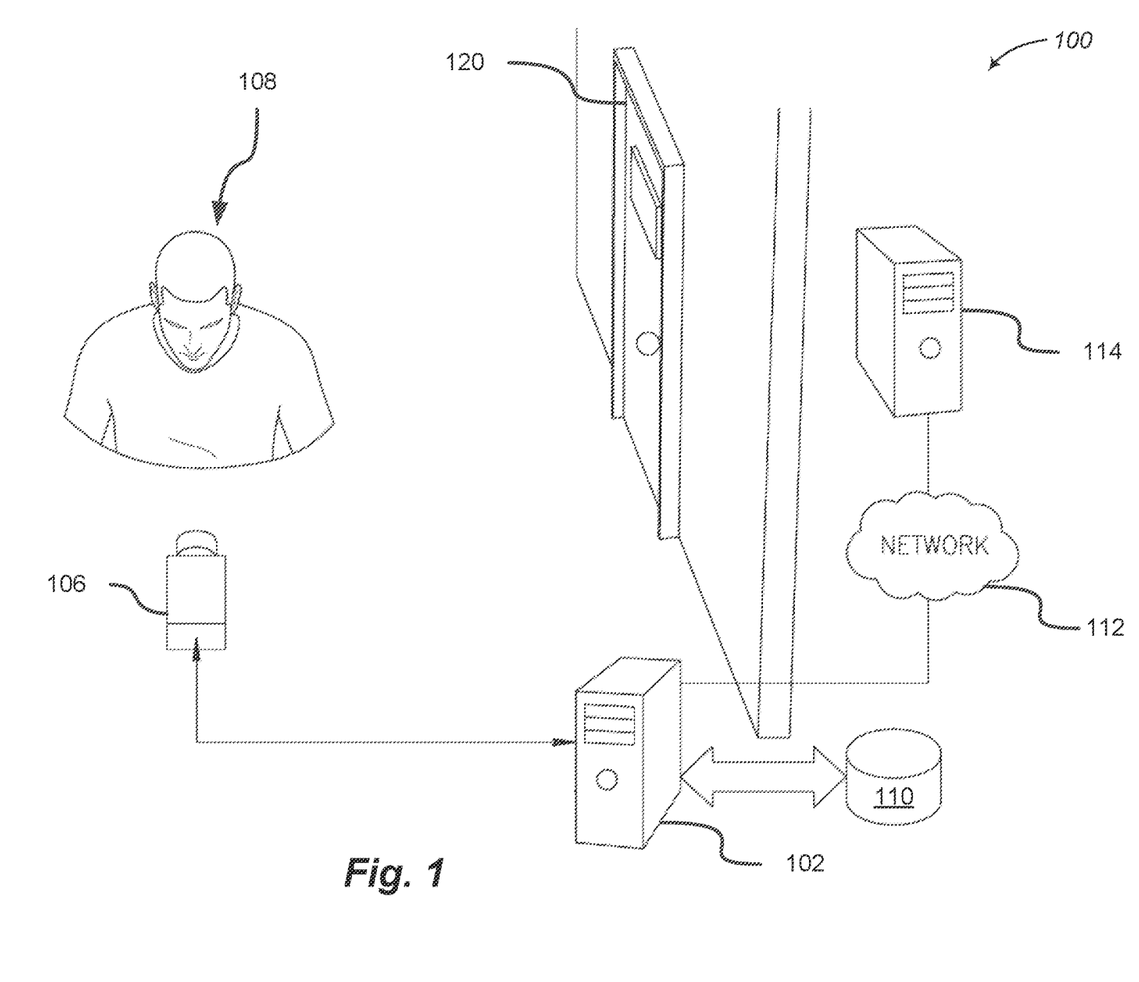
FIG. 1 is an example environment in which images of a subject are obtained and processed in accordance with embodiments described herein.

FIG. 1 is an example environment 100 in which images of a subject 108 are obtained and processed in accordance with embodiments described herein. The environment 100 includes a camera 106 and liveness detection system 102. In this example, the subject 108 is attempting to gain access through door 120 using facial authentication and authorization.

The subject 108 stands or sits in front of camera 106. The camera 106 captures one or more images of the face of the subject 108. The captured images are provided to the liveness detection system 102. The liveness detection system 102 performs embodiments described herein to determine if the face of the subject 108 is live or if a picture or display device is being used to present a fake face of the subject to the camera 106. If the face is live, then the liveness detection system 102 performs one or more facial authentication or authorization techniques to determine if the subject is authorized to access or open door 120.

In some embodiments, the liveness detection system 102 is in communication with database 110, which may store biometric information of subjects or users authorized to access door 120. Moreover, the liveness detection system 102 may be in communication with a remove server 114 via network 112. In some embodiments, the remote server 114 may perform embodiments similar to liveness detection system 102, such as to perform the liveness detection or the authentication and authorization techniques. In other embodiments, the remote server 114 may be employed to train or re-train neural networks to determine narrow-face-texture probabilities or broad-face-context probabilities, as described herein. The network 112 may be any combination of wired or wireless communication networks.

Although environment 100 is illustrated as enabling the subject 108 to gain access to door 120, embodiments are not so limited. Rather, embodiments described herein may be utilized to determine liveness of the subject to enable the subject to utilize facial authentication and authorization to unlock mobile computing devices (e.g., smartphones, tablets, or laptop computers), make online payments, take remote tests, perform secure banking, or perform other types of secure actions.

Figure 2:
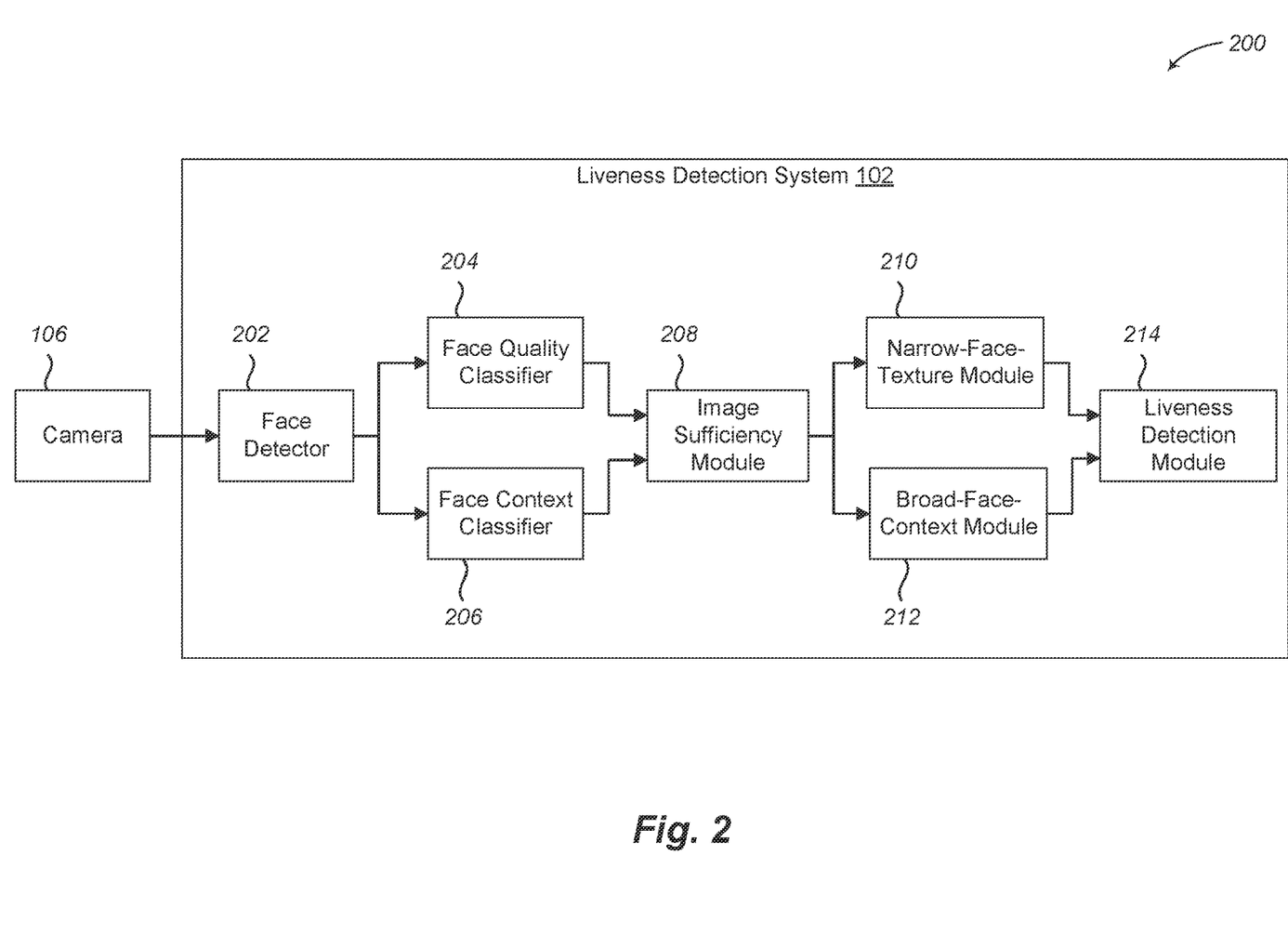
FIG. 2 is a context diagram of one non-limiting embodiment of a computing system that captures images of a subject and determines a liveness of the subject in accordance with embodiments described herein.

FIG. 2 is a context diagram of one non-limiting embodiment of a computing system 200 that captures images of a subject and determines a liveness of the subject in accordance with embodiments described herein. The system 200 includes a camera 106 and a liveness detection system 102. The liveness detection system 102 includes a face detector 202, a face quality classifier 204, a face context classifier 206, an image sufficiency module 208, a narrow-face-texture module 210, a broad-face-context module 212, and a liveness detection module 214.

The camera 106 captures images of a subject (e.g., subject 108 in FIG. 1) and provides the images to the face detector 202. The face detector 202 employs one or more techniques to detect a face within an image. If a face is detected, the face detector 202 provides the image, along with information regarding the detected face (e.g., a bounding box defining a position of the face within the image) to the face quality classifier 204 and the face context classifier 206. The face quality classifier 204 determines if the face in the image is of sufficient quality to perform a liveness determination, such as by determining one or more quality characteristics of the face. The face context classifier 206 determines if the face in the image has sufficient context to perform a liveness determination, such as by determining one or more context characteristics surrounding the face.

Results from the face quality classifier 204 and the face context classifier 206 are provided to the image sufficiency module 208. The image sufficiency module 208 utilizes the results or output from the face quality classifier 204 and the face context classifier 206 to determine if a liveness determination can be performed, such as by comparing one or more quality characteristics or context characteristics to one or more thresholds.

If the image sufficiency module 208 determines that a liveness determination can be performed on the image, the image sufficiency module 208 provides the image to the narrow-face-texture module 210 and the broad-face-context module 212. The narrow-face-texture module 210 determines a probability that the subject's face is live or fake based on a texture of the face. And the broad-face-context module 212 determines a probability that the subject's face is live or fake based on a context surrounding the face.

The probabilities generated by the narrow-face-texture module 210 and the broad-face-context module 212 are provided to the liveness detection module 214. The liveness detection module 214 compares the probabilities to one or more thresholds to determine whether the subject's face is live or fake. If the face is live, then the liveness detection module 214 may perform additional facial authentication techniques or it may instruct another module, component, or computing device (not illustrated) to perform such facial authentication.

The operation of certain aspects will now be described with respect to FIGS. 3A-3B, 4, and 5. Processes 300, 400, and 500 described in conjunction with FIGS. 3A-3B, 4, and 5, respectively, may be implemented by or executed on one or more computing devices, such as liveness detection system 102 in FIG. 1.

Figure 3A:
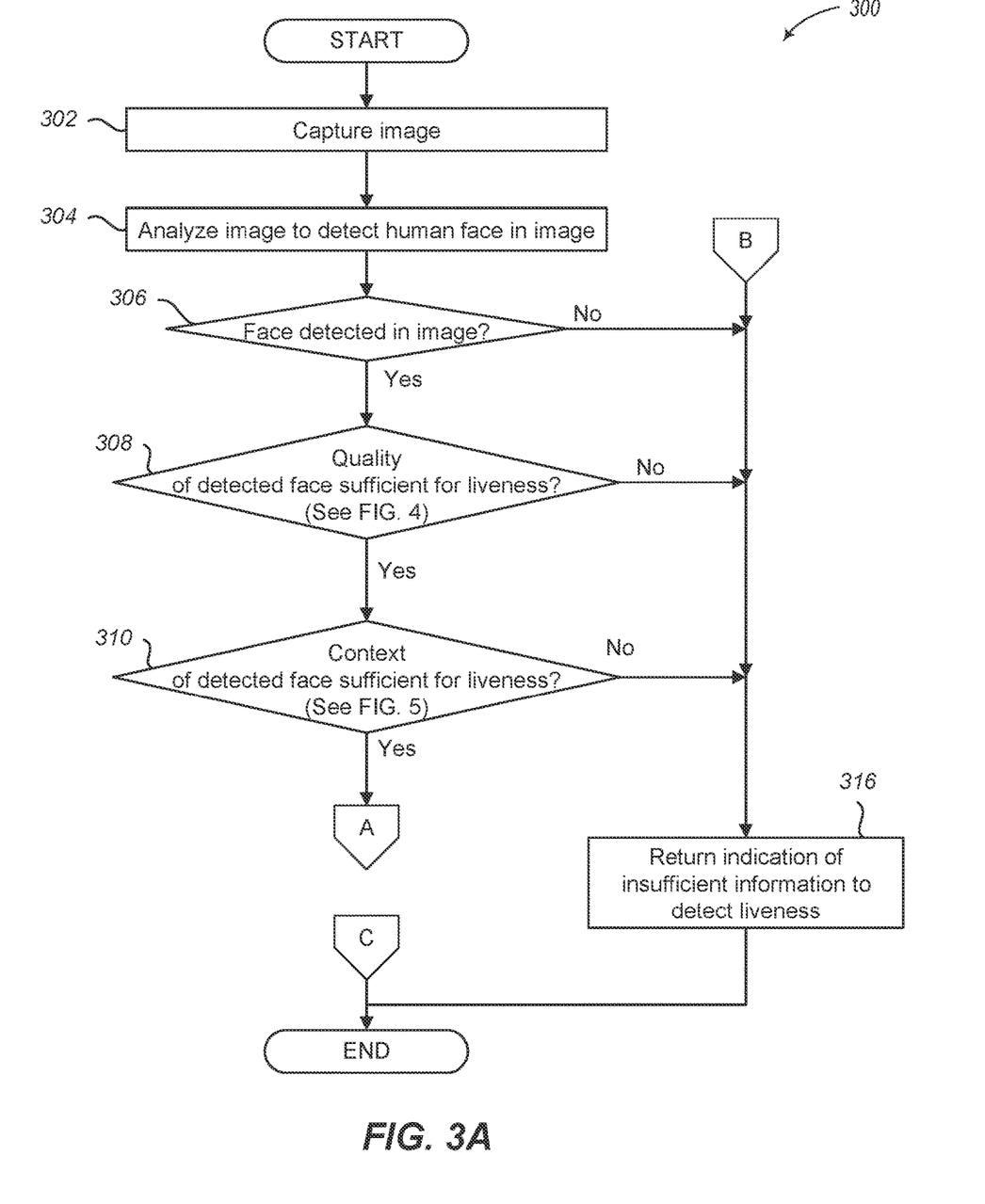
FIGS. 3A-3B are a logical flow diagram showing one embodiment of a process in which images of a subject are captured and analyzed to determine if the subject is a live person or a fake in accordance with embodiments described herein.
Figure 3B:
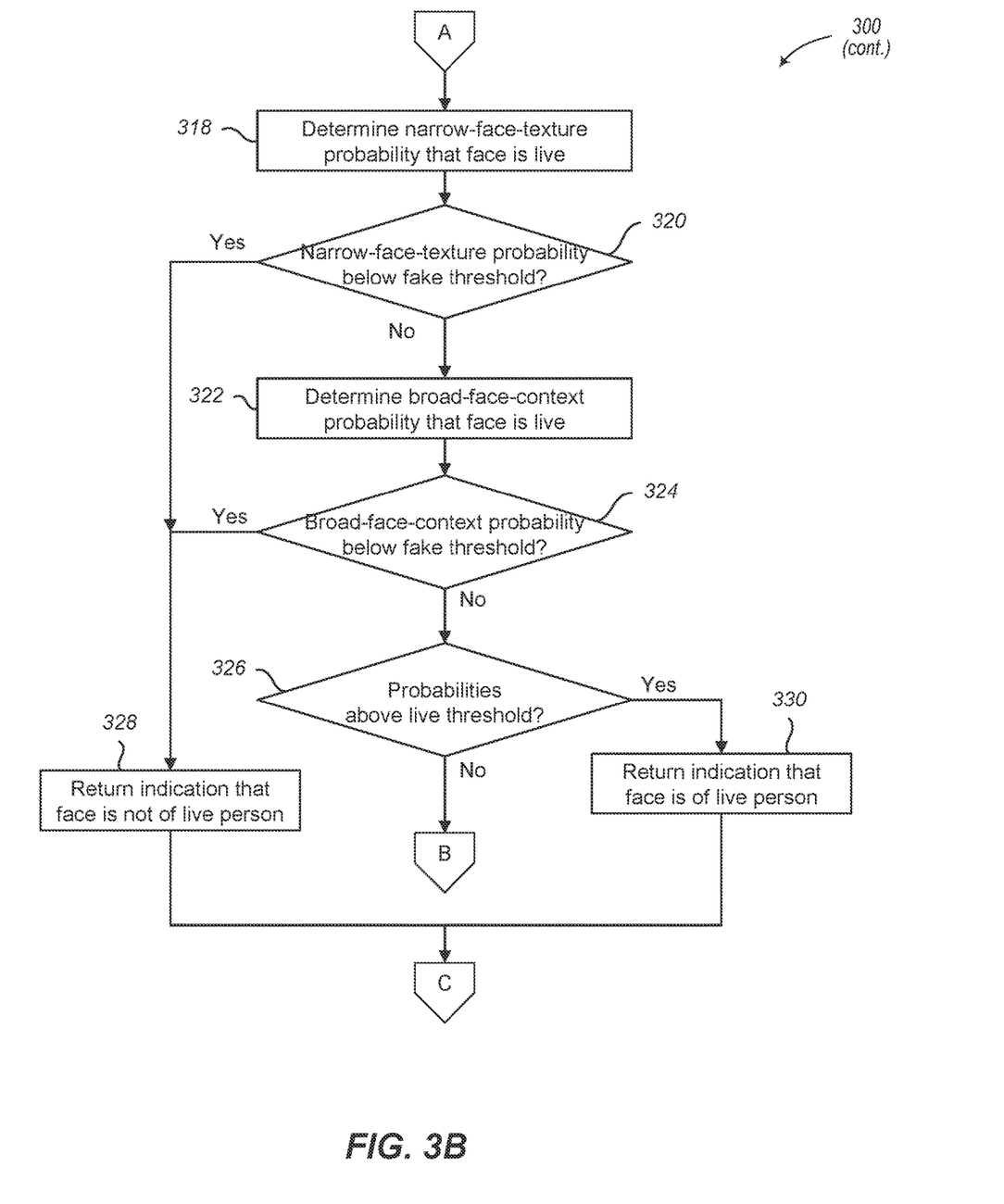

FIGS. 3A-3B are a logical flow diagram showing one embodiment of a process 300 in which images of a subject are captured and analyzed to determine if the subject is a live person or a fake in accordance with embodiments described herein.

Process 300 begins, after a start block, at block 302 in FIG. 3A, where an image of a subject is captured via a camera. As described herein, the subject includes of a face of a person in which the system is determining whether the face is of a live person or is fake (e.g., a picture or video of the person). Embodiments are generally described herein with respect to a single image. However, multiple images may be similarly analyzed. For example, each image or frame in a video may be analyzed to detect the liveness of the subject's face. In other embodiments, every nth image in the video may be analyzed, where n is selected by an administrator or system technician.

Process 300 proceeds to block 304, where the image is analyzed to detect a human face. The image may be analyzed using one or more facial distinction algorithm that can detect if a human face is depicted in the image as well as the location of the face within the image.

In various embodiments, a bounding box is generated to tightly fit around the face. Such a tight fitting bounding box may be a bounding box that has less than a threshold amount or number of pixels that surround, but are not part of the face. In at least one embodiment, the size of the bounding box may be reduced so that a portion of the face surrounds the bounding box. In this way, the bounding box is limited to features of the face without any pixels (or less than a threshold number or percentage) from a background or non-face portion of the image. The bounding box may be a rectangle, oval, or other shape that substantially mimics a two-dimensional shape of the human face, when looking at the face from the front.

Process 300 continues at decision block 306, where a determination is made whether a face is detected in the image. If a face is detected in the image, process 300 flows to decision block 308; otherwise, process 300 flows to block 316.

At decision block 308, a determination is made whether a quality of the detected face is sufficient for a liveness determination, which is illustrated and described in more detail below in conjunction with FIG. 4. If the quality of the detected face is sufficient for a liveness determination, then process 300 flows to decision block 310; otherwise, process 300 flows to block 316.

At decision block 310, a determination is made whether context associated with the detected face is sufficient for a liveness determination, which is illustrated and described in more detail below in conjunction with FIG. 5. If the context associated with the detected face is sufficient for a liveness determination, then process 300 flows to block 318 in FIG. 3B; otherwise, process 300 flows to block 316.

At block 318 in FIG. 3B, a narrow-face-texture probability is determined. The narrow-face-texture probability is a numerical likelihood that the face is live, and inversely a fake. In some embodiments, the image portion of the face within the tight bounding box determined at block 302 is used to determine the narrow-face-texture probability. Accordingly, the face image with no or small padding (e.g., padding in the range of 0-10% on each side or outside of the face) beyond the tight face bounding box is analyzed.

In various embodiments, the narrow-face-texture probability is determined using a texture analysis on the skin of the face, such as by using local binary patterns or other texture analysis techniques. This texture analysis may interpret subtle differences between how the skin of a live human reflects light compared to how a printed image of a face reflects light. In some embodiments, a neural network (or other machine learning or artificial intelligence mechanism) is trained to detect differences between real or live faces from fake faces depicted on printed materials (e.g., paper, photo paper, plastics, masks, or other material that can be used to mimic a face) can be used to determine the narrow-face-texture probability. In at least one embodiment, the result or output of the neural network is a probability that the face image within the bounding box is that of a live person. In some embodiments, this probability result is normalized, such as to a percentage or to a value between zero and one.

Process 300 proceeds next to decision block 320, where a determination is made whether the narrow-face-texture probability is below a fake threshold. In various embodiments, the fake threshold is set by an administrator, such as 20%. Thus, if the narrow-face-texture probability is below 20%, then the face in the image is determined to be a fake. Other fake thresholds may also be used depending on how strict an administrator wishes the system to positively identify fakes. For example, the lower the fake threshold, the more confident the system is that the face is fake before the system positively identifies the face as a fake. If the narrow-face-texture probability is below the fake threshold, then process 300 flows to block 328; otherwise, process 300 flows to block 322.

At block 322, a broad-face-context probability is determined. The broad-face-context probability is a numerical likelihood that the face is live, and inversely a fake. In some embodiments, the image portion of the face within the tight bounding box determined at block 302 along with significant padding outside of the bounding box is used to determine the broad-face-context probability. The image portion that is analyzed may be a box that has a width and a height, where the detected face is positioned somewhere in that image portion. In some embodiments, the image portion width is approximately the width of the detected face plus 200% of the width of the detected face and the image portion height is approximately the height of the detected face plus 100% of the height of the detected face. In other embodiments, the image portion width is approximately the width of the detected face plus 100% of the width of the detected face on the left and right of the face and the image portion height is approximately the height of the detected face plus 100% of the height of the detected face above and below the face. Other dimensions may also be used so long as the face is within the image portion and padding around the face.

In various embodiments, the broad-face-context probability is determined using a context analysis to detect edges or geometry that are consistent with devices that can project a fake face, such as display devices, monitors, tablet computers, smartphones, etc. In at least one embodiment, the context analysis may include object detection or other known scene analysis techniques.

In some embodiments, a neural network is trained to detect differences between real or live faces from fake faces displayed or presented via an image projection device, which can be used to determine the broad-face-context probability. The neural network may also be trained to detect live faces from fake faces in printed materials that include visible edges or frames (e.g., a picture frame). In at least one embodiment, the result or output of the neural network is a probability that the face is that of a live person. In some embodiments, this probability result is normalized, such as to a percentage or to a value between zero and one. This normalization of the broad-face-context probability is to align the probability base with the normalized narrow-face-texture probability.

Process 300 proceeds next to decision block 324, where a determination is made whether the broad-face-context probability is below the fake threshold, similar to what is performed in decision block 320. Thus, if the broad-face-context probability is below the fake threshold (e.g., 20%), then the face in the image is determined to be a fake. If the broad-face-context probability is below the fake threshold, then process 300 flows to block 328; otherwise, process 300 flows to decision block 326.

At block 328, an indication that the subject's face depicted in the images is not of a live person or is considered a fake is returned. In various embodiments, this indication is sent or reported to an administrator or authority to indicate that a fake image of a subject's face is being used to circumvent the authentication process. After block 328, process 300 terminates or otherwise returns to a calling process to perform other actions (as shown in FIG. 3A).

If the broad-face-context probability and the narrow-face-texture probability are above the fake threshold, then process 300 proceeds at decision block 326. At decision block 326, a determination is made whether the broad-face-context probability and the narrow-face-texture probability are above a live threshold. In some embodiments, the lowest or minimum of the two probabilities is compared to the live threshold. In other embodiments, an average of the two probabilities is compared to the live threshold. In yet other embodiments, a highest or maximum of the two probabilities is compared to the live threshold.

The selection of which probability to use and compare against the live threshold may be set by an administrator based on a level of tolerance desired in detecting a live face. For example, if the system is to be stricter and be more confident that the subject's face is live, then the minimum probability may be selected and compared to the live threshold. Conversely, if the system is to be less strict, such that it does not have to be as confident, then the average or maximum probability may be selected and compared to the live threshold.

In various embodiments, the live threshold is set by an administrator, such as 70%. Thus, if the narrow-face-texture probability and the broad-face-context probability are above 70%, then the face in the image is determined to be real and live. Other live thresholds may also be used depending on how strict an administrator wishes the system to positively identify real or live faces. For example, the higher the live threshold, the more confident the system is that the face is real before the system positively identifies the face as live. If the probabilities are above the live threshold, then process 300 flows to block 330; otherwise, process 300 flows to block 316 in FIG. 3A.

At block 330, an indication that the subject's face depicted in the images is of a live person or is considered real is returned. In various embodiments, this indication is utilized to proceed with additional authentication processes, such as one or more face recognition algorithms to determine if the subject is an authorized user. After block 330, process 300 terminates or otherwise returns to a calling process to perform other actions (as shown in FIG. 3A).

If a face is not detected in the image at decision block 306, or if the quality of the detected face is insufficient for liveness determination at decision block 308, or if the context of the detected face is insufficient for liveness determination at decision block 310, or if the narrow-face-texture probability and the broad-face-context probability are above the fake threshold but below the narrow threshold, then process 300 flows to block 316 in FIG. 3A. At block 316, an indication of insufficient information to detect liveness is returned. After block 316, process 300 terminates or otherwise returns to a calling process to perform other actions.

In some embodiments, process 300 may loop to block 302 to continually capture and process additional images for a select period of time, such as an allowable authentication time set by an administrator.

Figure 4:
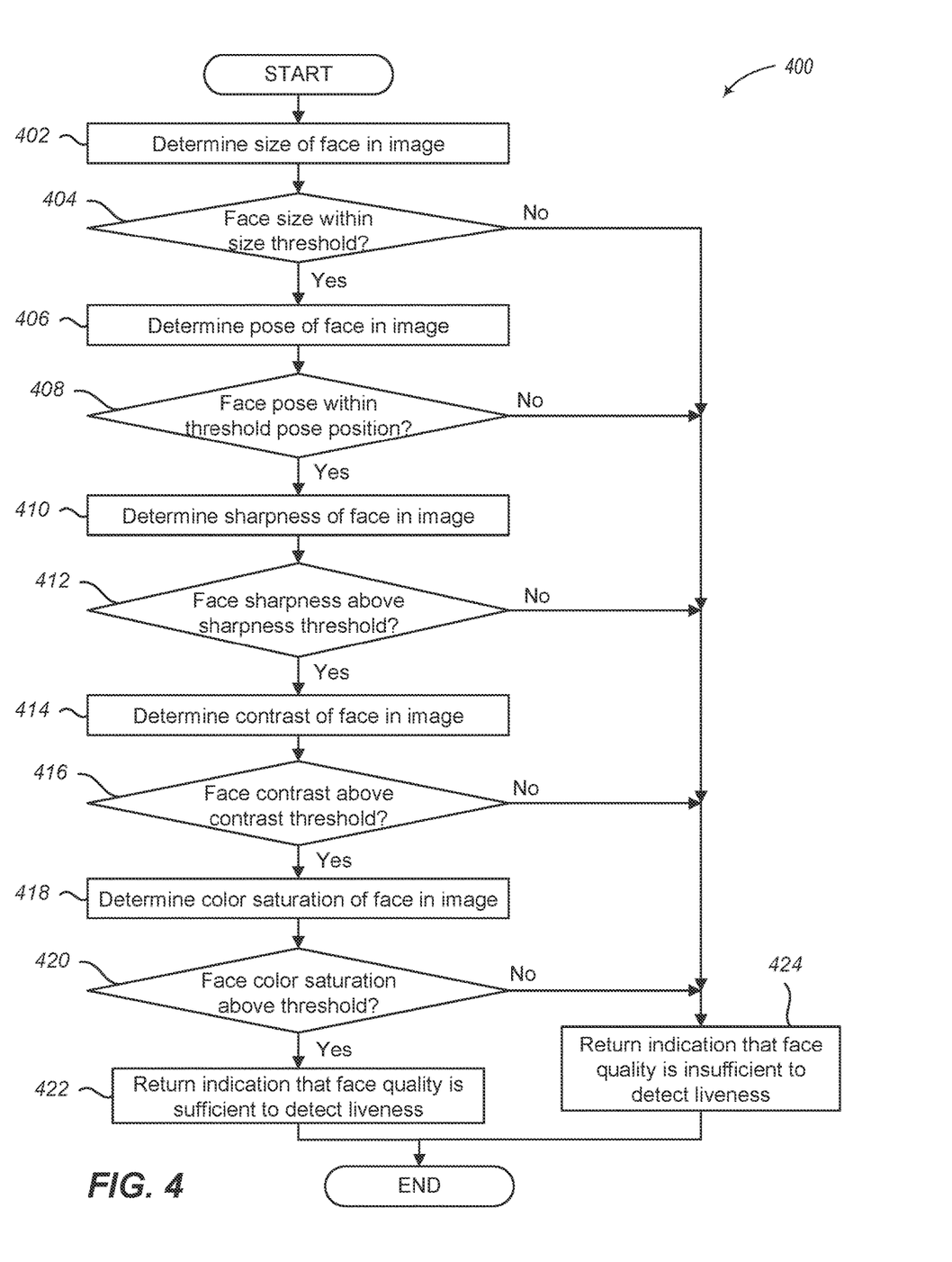
FIG. 4 is a logical flow diagram of one embodiment of a process to determine if the captured image is of sufficient quality to detect liveness in accordance with embodiments described herein.

FIG. 4 is a logical flow diagram of one embodiment of a process 400 to determine if the captured image is of sufficient quality to detect liveness in accordance with embodiments described herein.

Process 400 begins, after a start block, at block 402, where a size of the face in the image is determined. In at least one embodiment, the size of the face is a pixel width of the face or face bounding box in the image.

Process 400 proceeds to decision block 404, where a determination is made whether the face size is within a size threshold. In some embodiments, the size threshold may include a minimum number of pixel and a maximum number of pixels. For example, the minimum number of pixels in the width of the detected face may be 150 pixels, and the maximum number of pixels in the width of the detected face may be 500 pixels. In some embodiments, only a minimum threshold is utilized. If the face size is within the size threshold, then process 400 flows to block 406; otherwise, process 400 flows to block 424.

At block 406, a pose of the face in the image is determined. In various embodiments, the pose is a general detected direction of the face relative to a camera that captured the image of the face.

Process 400 continues at decision block 408, where a determination is made whether the face pose is within a threshold pose position. In some embodiments, the desired face pose is where the face is pointed directly at the camera. In at least one embodiment, the threshold pose position may be plus 20 degrees yaw, minus 20 degrees yaw, plus 20 degrees pitch, minus 20 degrees pitch, plus 15 degrees rotation, and minus 15 degrees rotation of the face from the perspective of the camera. If the face pose is within the threshold pose position, then process 300 flows to block 410; otherwise, process 400 flows to block 424.

At block 410, a sharpness of the face in the image is determined. In at least one embodiment the sharpness of the face is the overall clarity of the face with respect to focus, blur, and other image artifact that reduce the textual details of the face. In various embodiments, the sharpness may be determined using one or more known sharpness analysis techniques, such the 10-90% rise distance technique, modulation transfer function (MTF), special and frequency domains, slanted-edge algorithm, etc.

Process 400 proceeds next to decision block 412, where a determination is made whether the sharpness is above a sharpness threshold. In various embodiments, the sharpness threshold is selected by an administrator and may be selected based on the sharpness analysis technique used. If the face sharpness is above the sharpness threshold, then process 400 flows to block 414; otherwise, process 400 flows to block 424.

At block 414, a contrast of the face in the image is determined. In various embodiments, the contrast may be determined based on differences in the luminance or color of the face using one or more known contrast analysis techniques, such as Weber contrast, Michelson contrast, RMS contrast, etc.

Process 400 proceeds next to decision block 414, where a determination is made whether the contrast is above a contrast threshold. In various embodiments, the contrast threshold is selected by an administrator and may be selected based on the contrast analysis technique used. If the face contrast is above the contrast threshold, then process 400 flows to block 418; otherwise, process 400 flows to block 424.

At block 418, a color saturation of the face in the image is determined. In various embodiments, the color saturation is the intensity and purity of colors of the face in the image, such that saturation of a color is determined by a combination of light intensity and how much the light is distributed across the spectrum of different colors or wavelengths. In various embodiments, the color saturation may be determined using one or more known color saturation analysis techniques, such as CIELUV and CIELAB, CIECAM02, etc.

Process 400 proceeds next to decision block 420, where a determination is made whether the color saturation is above a color saturation threshold. In various embodiments, the color saturation threshold is selected by an administrator and may be selected based on the color saturation analysis technique used. If the face color saturation is above the color saturation threshold, then process 400 flows to block 422; otherwise, process 400 flows to block 424.

At block 422, an indication that the face quality is sufficient to detect liveness is returned. After block 422, process 400 returns to a calling process (e.g., process 300 in FIGS. 3A-3B).

At block 424, an indication that the face quality is insufficient to detect liveness is returned. After block 424, process 400 returns to a calling process (e.g., process 300 in FIGS. 3A-3B).

Figure 5:
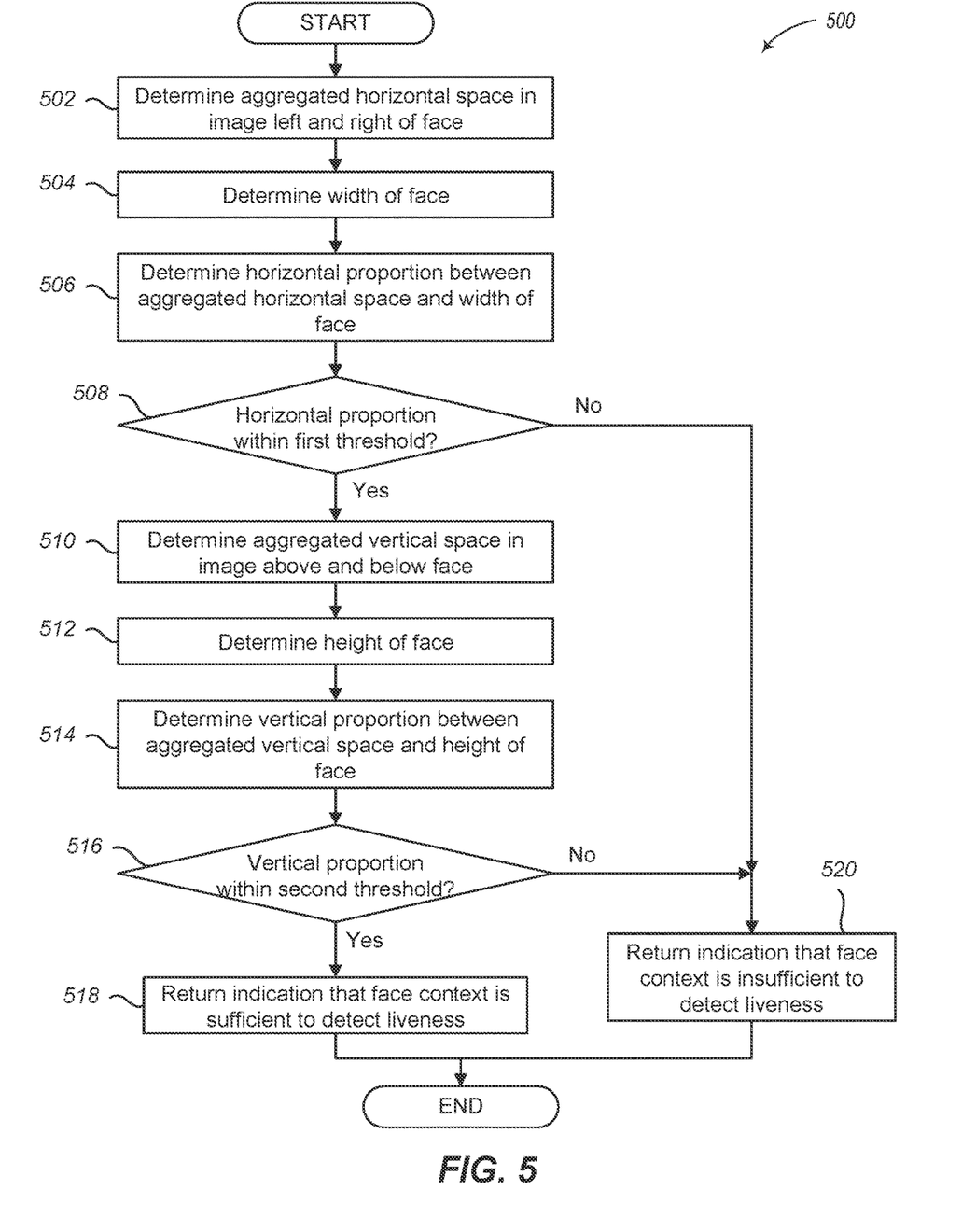
FIG. 5 is a logical flow diagram of one embodiment of a process to determine if the captured image includes sufficient context to detect liveness in accordance with embodiments described herein.

FIG. 5 is a logical flow diagram of one embodiment of a process 500 to determine if the captured image includes sufficient context to detect liveness in accordance with embodiments described herein.

Process 500 begins, after a start block, at block 502, where an aggregated horizontal space left and right of the face in the image is determined. In various embodiments, a first number of pixels to the left of the face is determined and a second number of pixels to the right of the face is determined. The first and second number of pixels are combined or aggregated into a single horizontal space pixel value.

Process 500 proceeds to block 504, where a pixel width of the face is determined. In some embodiments, this face width is the maximum width of a face bounding box determined with detecting the face.

Process 500 continues to block 506, where a horizontal proportion between the aggregated horizontal space and the face width is determined. In various embodiments, the proportion is set as a percentage of the aggregated horizontal space relative to the face width.

Process 500 proceeds next to decision block 508, where a determination is made whether the horizontal proportion is within a first threshold. In at least one embodiment, the first threshold may be 200%, such that the aggregated horizontal space is 200% larger than the width of the face. Other thresholds may be utilized based on the capabilities or positioning of the camera. If the horizontal proportion is within the first threshold, then process 500 flows to block 510; otherwise, process 500 flows to block 520.

At block 510, where an aggregated vertical space above and below the face in the image is determined. In various embodiments, a first number of pixels above the face is determined and a second number of pixels below the face is determined. The first and second number of pixels are combined or aggregated into a single vertical space pixel value.

Process 500 proceeds to block 512, where a pixel height of the face is determined. In some embodiments, this face height is the maximum height of a face bounding box determined with detecting the face.

Process 500 continues to block 514, where a vertical proportion between the aggregated vertical space and the face height is determined. In various embodiments, the proportion is set as a percentage of the aggregated vertical space relative to the face height.

Process 500 proceeds next to decision block 516, where a determination is made whether the vertical proportion is within a second threshold. In at least one embodiment, the second threshold may be 100%, such that the aggregated vertical space is 100% larger than the height of the face. Other thresholds may be utilized based on the capabilities or positioning of the camera. If the vertical proportion is within the second threshold, then process 500 flows to block 518; otherwise, process 500 flows to block 520.

At block 518, an indication that the face context is sufficient to detect liveness is returned. After block 518, process 500 returns to a calling process (e.g., process 300 in FIGS. 3A-3B).

At block 520, an indication that the face context is insufficient to detect liveness is returned. After block 520, process 500 returns to a calling process (e.g., process 300 in FIGS. 3A-3B).

The blocks illustrated in FIG. 3A-3B, 4, or 5 may be executed in parallel, sequentially, or in a different order than what is described. For example, although process 300 in FIGS. 3A-3B illustrates determining the narrow-face-texture probability before determining the broad-face-context probability, embodiments are not so limited. In other embodiments, the broad-face-context probability is determined before the narrow-face-texture probability. Similarly, in other embodiments, the determination of whether the narrow-face-texture probability is below the fake threshold may be performed after the broad-face-context probability it determined.

Figure 6:
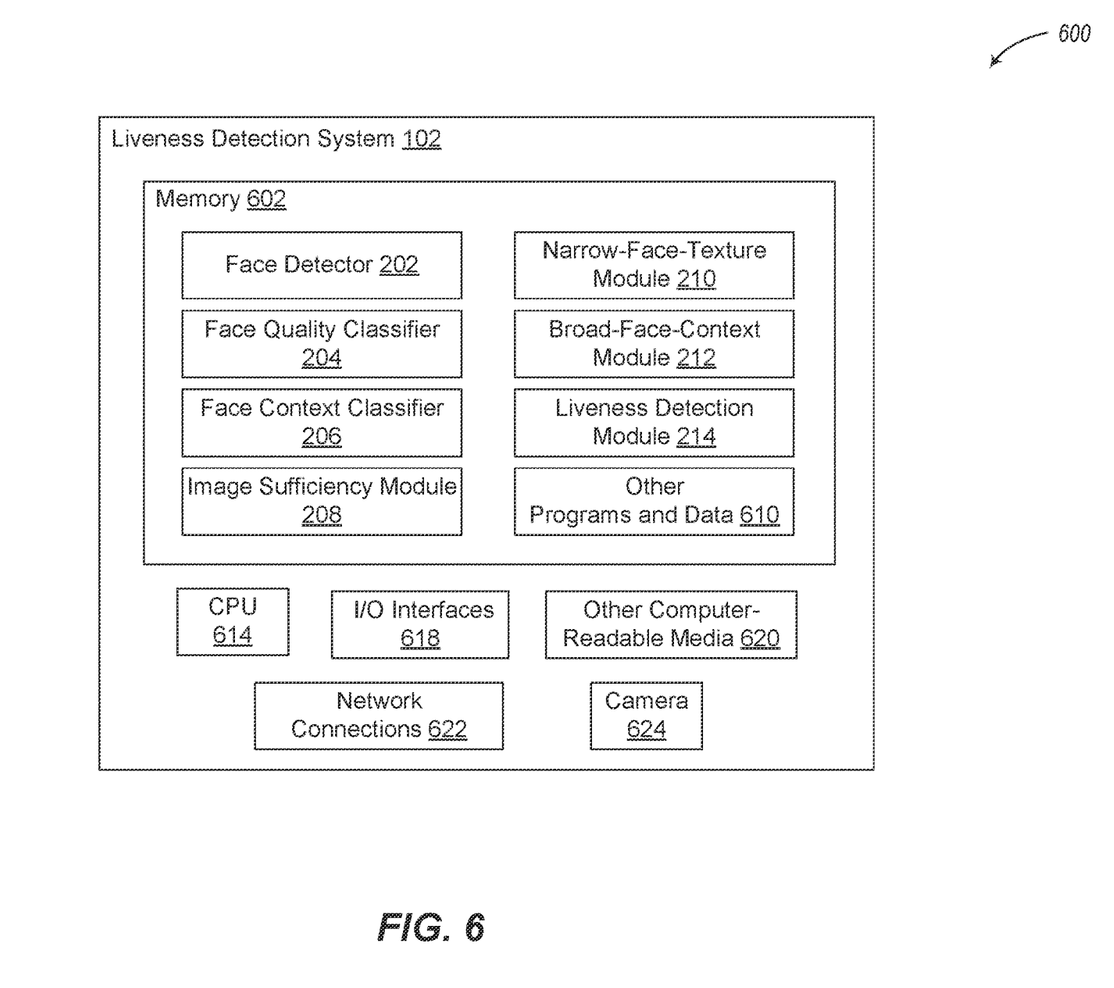
FIG. 6 is a system diagram that describes one implementation of computing systems for implementing embodiments described herein.

FIG. 6 shows a system diagram that describes one implementation of computing systems for implementing embodiments described herein. System 600 includes a liveness detection system 102.

Liveness detection system 102 captures or receives images of a subject's face to determine if the face is live or fake. One or more special-purpose computing systems may be used to liveness detection system 102. Accordingly, various embodiments described herein may be implemented in software, hardware, firmware, or in some combination thereof. Liveness detection system 102 may include memory 602, one or more central processing units (CPUs) 614, I/O interfaces 618, other computer-readable media 620, network connections 622, and camera 624.

Camera 624 may be embedded in liveness detection system 102 or it may be external to, but in communication with, the liveness detection system 102. The camera 624 may be a RGB camera or other suitable camera that captures colored images of a subject's face.

Memory 602 may include one or more various types of non-volatile or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof.

Memory 602 is utilized to store information, including computer-readable instructions that are utilized by CPU 614 to perform actions and embodiments described herein. For example, memory 602 may have stored thereon face detector 202, face quality classifier 204, face context classifier 206, image sufficiency module 208, narrow-face-texture module 210, broad-face-context module 212, and liveness detection module 214. The face detector 202 is configured to receive images of a subject and detect a face within the images. The face quality classifier 204 is configured to determine if the face in the images is of sufficient quality to perform liveness determination. The face context classifier 206 is configured to determine if the face in the images has sufficient context to perform liveness determination. The image sufficiency module 208 is configured to utilize the output of the face quality classifier 204 and the face context classifier 206 to determine if liveness determination can be performed. The narrow-face-texture module 210 is configured to determine a probability that the subject's face is live or fake based on a texture of the face. The broad-face-context module 212 is configured to determine a probability that the subject's face is live or fake based on a context surrounding the face. The liveness detection module 214 is configured to utilize the probabilities from the narrow-face-texture module 210 and the broad-face-context module 212 to determine whether the subject's face is live or fake. Although FIG. 6 shows each of these modules as being separate, embodiments are not so limited. Rather, more or fewer modules may be utilized to perform the functionality described herein.

Memory 602 may also store other programs and data 610 to perform other actions associated with the operation of liveness detection system 102. For example, the other programs and data 610 may store information that can be used to authentic users based on a subject's face being determined to be live.

Network connections 622 are configured to communicate with other computing devices not illustrated in this figure. In various embodiments, the network connections 622 include transmitters and receivers (not illustrated) to send and receive data. I/O interfaces 618 may include a keyboard, audio interfaces, video interfaces, or the like. Other computer-readable media 620 may include other types of stationary or removable computer-readable media, such as removable flash drives, external hard drives, or the like.

Although FIG. 6 illustrates the liveness detection system 102 as a single computing device, embodiments are not so limited. Rather, in some embodiments, a plurality of computing devices may be in communication with one another to provide the functionality of the liveness detection system 102. Such computing devices may include smart phones, tablet computers, laptop computers, desktop computers, televisions, projectors, set-top-boxes, content receivers, other computing devices, or some combination thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a camera that captures an image;
a memory that stores computer instructions; and
a processor that executes the computer instructions to perform actions, including:
analyzing the image to detect the presence of a face in the image;
determining if a quality of the face in the image is sufficient for determining liveness of the face;
determining if context surrounding the face in the image is sufficient for determining liveness of the face; and
in response to the quality of the face in the image being sufficient for determining liveness of the face and in response to the context surrounding the face in the image being sufficient for determining liveness of the face:
determining a narrow-face-texture probability that the face is live;
determining a broad-face-context probability that the face is live;
comparing the narrow-face-texture probability and the broad-face-context probability to a live threshold and a fake threshold;
in response to the narrow-face-texture probability and the broad-face-context probability exceeding the live threshold, outputting an indication that the face is live;
in response to either the narrow-face-texture probability or the broad-face-context probability, or both, is below the fake threshold, outputting an indication that the face is fake; and
in response to the narrow-face-texture probability and the broad-face-context probability being above the fake threshold and below the live threshold, outputting an indication that the image includes insufficient information to determine whether the face is live or fake.

2. The system of claim 1, wherein the processor determines if the quality of the face in the image is sufficient for determining liveness of the face by executing the computer instructions to perform further actions, including:
determining a size of the face; and
determining that the face in the image is sufficient for determining liveness in response to the size of the face being within a size threshold.

3. The system of claim 1, wherein the processor determines if the quality of the face in the image is sufficient for determining liveness of the face by executing the computer instructions to perform further actions, including:
determining a pose of the face; and
determining that the face in the image is sufficient for determining liveness in response to the pose of the face being within a pose threshold.

4. The system of claim 1, wherein the processor determines if the quality of the face in the image is sufficient for determining liveness of the face by executing the computer instructions to perform further actions, including:
determining an image sharpness of the face; and
determining that the face in the image is sufficient for determining liveness in response to the image sharpness of the face being within a sharpness threshold.

5. The system of claim 1, wherein the processor determines if the quality of the face in the image is sufficient for determining liveness of the face by executing the computer instructions to perform further actions, including:
determining an image contrast of the face; and
determining that the face in the image is sufficient for determining liveness in response to the image contrast of the face being within a contrast threshold.

6. The system of claim 1, wherein the processor determines if the quality of the face in the image is sufficient for determining liveness of the face by executing the computer instructions to perform further actions, including:
determining an image color saturation of the face; and
determining that the face in the image is sufficient for determining liveness in response to the image color saturation of the face being within a color saturation threshold.

7. The system of claim 1, wherein the processor determines if the context surrounding the face in the image is sufficient for determining liveness of the face by executing the computer instructions to perform further actions, including:
determining a width of the face in the image;
determining a first horizontal space in the image left of the face;
determining a second horizontal space in the image right of the face;
determining an aggregated horizontal space based on an aggregation of the first horizontal space and the second horizontal space;
determining a horizontal space proportion between the aggregated horizontal space and the width of the face; and
determining that the face in the image is sufficient for determining liveness in response to the horizontal space proportion exceeding a threshold.

8. The system of claim 1, wherein the processor determines if the context surrounding the face in the image is sufficient for determining liveness of the face by executing the computer instructions to perform further actions, including:
determining a height of the face in the image;
determining a first vertical space in the image above the face;
determining a second vertical space in the image below the face;
determining an aggregated vertical space based on an aggregation of the first vertical space and the second vertical space;
determining a vertical space proportion between the aggregated vertical space and the height of the face; and
determining that the face in the image is sufficient for determining liveness in response to the vertical space proportion exceeding a threshold.

9. The system of claim 1, wherein the processor determines the narrow-face-texture probability that the face is live by executing the computer instructions to perform further actions, including:

employing a neural network to output the narrow-face-texture probability based on an analysis of the image, wherein the neural network is trained to detect texture in the face and whether the face is live or fake.

10. The system of claim 1, wherein the processor determines the broad-face-context probability that the face is live by executing the computer instructions to perform further actions, including:
   employing a neural network to output the broad-face-context probability based on an analysis of the image, wherein the neural network is trained to detect shapes and geometry surrounding the face indicative that face is fake.

11. A system, comprising:
   a camera that captures an image;
   a memory that stores computer instructions; and
   a processor that executes the computer instructions to perform actions, including:
      analyzing the image to detect the presence of a face in the image;
      determining if a quality of the face in the image is sufficient for determining liveness of the face;
      determining if context surrounding the face in the image is sufficient for determining liveness of the face; and
      in response to the quality of the face in the image being sufficient for determining liveness of the face and in response to the context surrounding the face in the image being sufficient for determining liveness of the face:
         determining a narrow-face-texture probability that the face is live;
         determining a broad-face-context probability that the face is live;
         comparing the narrow-face-texture probability and the broad-face-context probability to one or more liveness thresholds;
         in response to the comparison of the narrow-face-texture probability and the broad-face-context probability to the one or more liveness thresholds, outputting an indication that: the face is live, the face is fake, or the image includes insufficient information to determine whether the face is live or fake.

12. The system of claim 11, wherein the processor determines if the context surrounding the face in the image is sufficient for determining liveness of the face by executing the computer instructions to perform further actions, including:
   determining a width of the face in the image;
   determining a first horizontal space in the image left of the face;
   determining a second horizontal space in the image right of the face;
   determining an aggregated horizontal space based on an aggregation of the first horizontal space and the second horizontal space;
   determining a horizontal space proportion between the aggregated horizontal space and the width of the face; and
   determining that the face in the image is sufficient for determining liveness in response to the horizontal space proportion exceeding a threshold.

13. The system of claim 11, wherein the processor determines if the context surrounding the face in the image is sufficient for determining liveness of the face by executing the computer instructions to perform further actions, including:
   determining a height of the face in the image;
   determining a first vertical space in the image above the face;
   determining a second vertical space in the image below the face;
   determining an aggregated vertical space based on an aggregation of the first vertical space and the second vertical space;
   determining a vertical space proportion between the aggregated vertical space and the height of the face; and
   determining that the face in the image is sufficient for determining liveness in response to the vertical space proportion exceeding a threshold.

14. The system of claim 11, wherein the processor determines the narrow-face-texture probability that the face is live by executing the computer instructions to perform further actions, including:
   employing a neural network to output the narrow-face-texture probability based on an analysis of the image, wherein the neural network is trained to detect texture in the face and whether the face is live or fake.

15. The system of claim 11, wherein the processor determines the broad-face-context probability that the face is live by executing the computer instructions to perform further actions, including:
   employing a neural network to output the broad-face-context probability based on an analysis of the image, wherein the neural network is trained to detect shapes and geometry surrounding the face indicative that face is fake.

16. A method, comprising:
   analyzing an image of a subject to detect the presence of a face in the image;
   determining if the image is sufficient for determining liveness of the face; and
   in response to the image being sufficient for determining liveness of the face:
      determining a broad-face-context probability that the face is live;
      comparing the broad-face-context probability to one or more liveness thresholds;
      determining a narrow-face-texture probability that the face is live;
      comparing the narrow-face-texture probability to one or more other liveness thresholds; and
      in response to the comparison of the broad-face-context probability to the one or more liveness thresholds and the comparison of the narrow-face-texture probability to the one or more other liveness thresholds, outputting an indication that: the face is live, the face is fake, or the image includes insufficient information to determine whether the face is live or fake.

17. The method of claim 16, wherein determining the broad-face-context probability that the face is live further comprises:
   employing a neural network to output the broad-face-context probability based on an analysis of the image, wherein the neural network is trained to detect shapes and geometry surrounding the face indicative that face is fake.

18. A method, comprising:
   analyzing an image of a subject to detect the presence of a face in the image;

determining if the image is sufficient for determining liveness of the face; and in response to the image being sufficient for determining liveness of the face:

determining a narrow-face-texture probability that the face is live;

comparing the narrow-face-texture probability to one or more liveness thresholds;

determining a broad-face-context probability that the face is live;

comparing the broad-face-context probability to one or more other liveness thresholds; and in response to the comparison of the narrow-face-texture probability to the one or more liveness thresholds and the comparison of the broad-face-context probability to the one or more other liveness thresholds, outputting an indication that: the face is live, the face is fake, or the image includes insufficient information to determine whether the face is live or fake.

19. The method of claim 18, wherein determining the narrow-face-texture probability that the face is live further comprises:

employing a neural network to output the narrow-face-texture probability based on an analysis of the image, wherein the neural network is trained to detect texture in the face and whether the face is live or fake.

* * * * *

UNITED STATES PATENT AND TRADEMARK OFFICE
CERTIFICATE OF CORRECTION

| | |
|---|---|
| PATENT NO. | : 12,106,607 B2 |
| APPLICATION NO. | : 17/698800 |
| DATED | : October 1, 2024 |
| INVENTOR(S) | : Milko Boic et al. |

It is certified that error appears in the above-identified patent and that said Letters Patent is hereby corrected as shown below:

On the Title Page

Item (72), Inventors/First Named Inventor:
"Miko Boic, Seattle, WA (US)"
Should read:
--Milko Boic, Seattle, WA (US)--

Signed and Sealed this
Twelfth Day of November, 2024

Katherine Kelly Vidal
*Director of the United States Patent and Trademark Office*